United States Patent
Roth

[15] 3,661,414
[45] May 9, 1972

[54] SHOVEL CART

[72] Inventor: Frank Roth, 6840 Thomas Street, Hollywood, Fla. 33024

[22] Filed: June 17, 1970

[21] Appl. No.: 47,016

[52] U.S. Cl. ..........294/59, 37/130, 280/35, 280/47.13 R, 280/47.24
[51] Int. Cl. ..........B62b 1/12, B62b 1/14
[58] Field of Search ..........280/35, 47.13, 47.17, 47.18, 280/47.24, 79.1, 179 R; 294/59; 37/130

[56] References Cited

UNITED STATES PATENTS

| | | | |
|---|---|---|---|
| 1,023,997 | 4/1912 | Danielson | 294/59 X |
| 1,642,502 | 9/1927 | Krasberg | 280/35 |
| 609,129 | 8/1898 | Twist | 280/47.27 X |
| 917,648 | 4/1909 | Olds | 294/59 X |
| 1,232,361 | 7/1917 | Mills | 294/59 |
| 1,716,785 | 6/1929 | Linsley | 294/59 |
| 2,598,952 | 6/1952 | Weingart | 280/47.24 X |
| 1,495,442 | 5/1924 | Rosencrans | 280/179 |
| 1,592,944 | 7/1926 | Jones | 280/35 X |

Primary Examiner—Benjamin Hersh
Assistant Examiner—Leslie J. Paperner

[57] ABSTRACT

A cart readily formed from any square shovel by removably securing therebelow a carriage comprised of a telescopic axle shaft mounted at its opposite ends upon a pair of wheels, and the axle shaft end sections each including a spring band clamp for attachment over one of the opposite ends upon a pair of wheels, and the axle shaft end sections each including a spring band clamp for attachment over one of the opposite side edges of the shovel.

2 Claims, 3 Drawing Figures

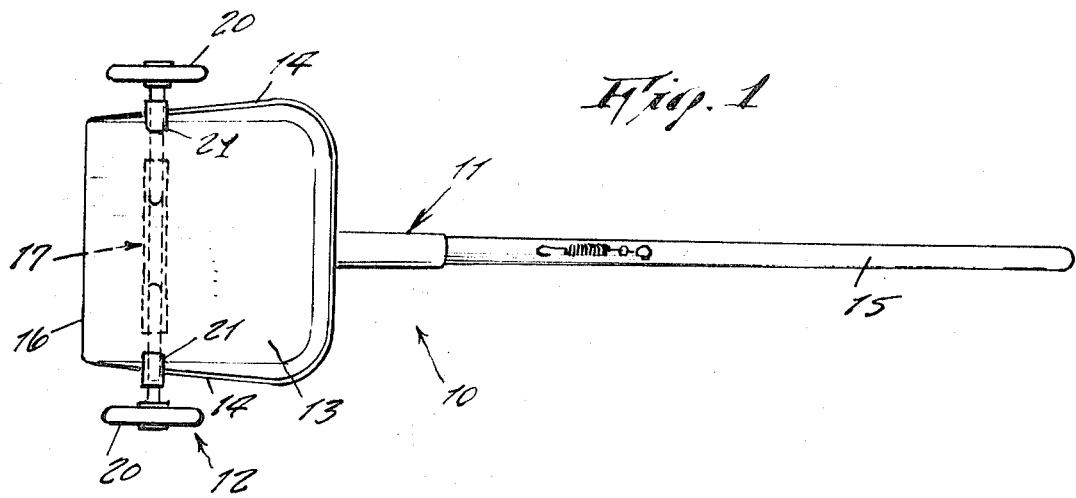
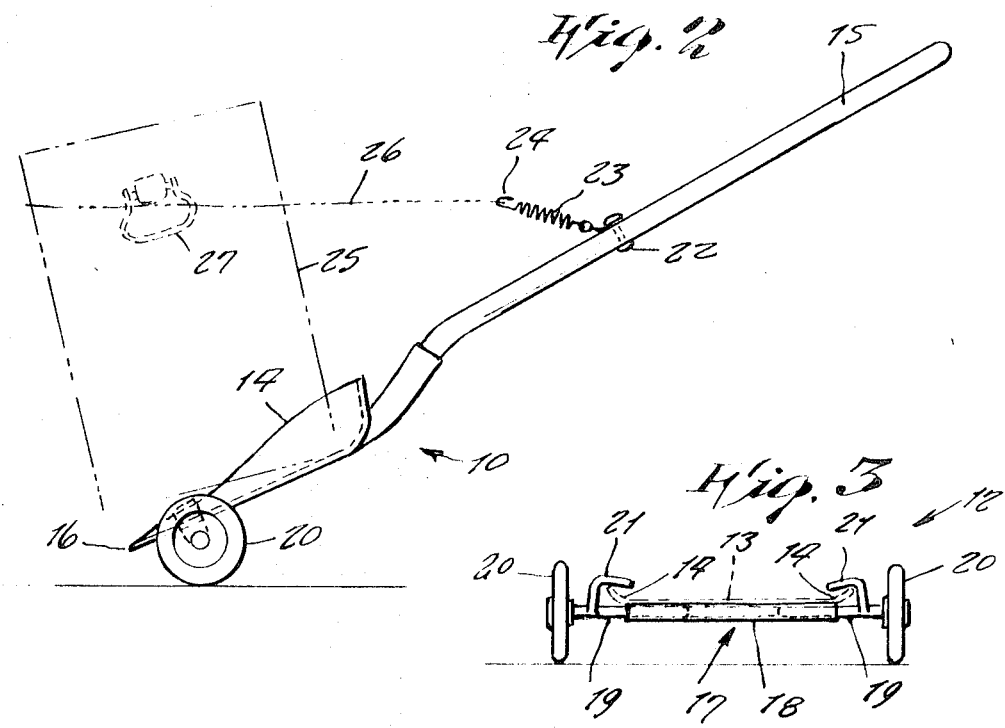
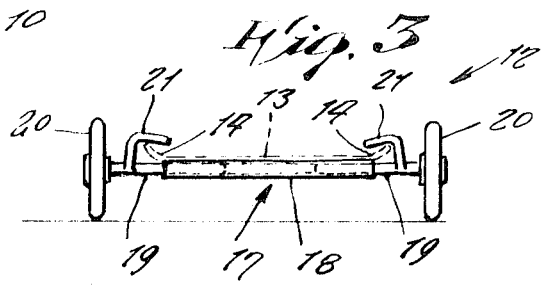
INVENTOR
FRANK ROTH

SHOVEL CART

This invention relates generally to small carts. More specifically it relates to readily erectable carts.

A principal object of the present invention is to provide a shovel cart which can be readily formed by easily securing a specially designed carriage below any square shovel.

Another object of the invention is to provide a shovel cart wherein the carriage is designed to be telescopic so that it is adjustable in length for readily being secured to any width of square shovel.

Yet another object is to provide a shovel cart wherein the conventional handle of the shovel forms the steering handle of the cart.

Yet another object is to provide a shovel cart wherein the shovel blade forms the body of the cart and upon which objects may be placed for transportation.

Other objects are to provide a shovel cart which is simple in design, inexpensive to manufacture, rugged in construction, easy to use and efficient in operation.

These and other objects will be readily evident upon a study of the following specification and the accompanying drawing wherein:

FIG. 1 is a top plan view of the assembled shovel cart.

FIG. 2 is a side view thereof shown transporting a garbage can or the like.

FIG. 3 is a rear view of the carriage shown secured to the removable shovel blade.

Referring now to the drawing in detail, the reference numeral 10 represents a shovel cart according to the present invention wherein there is a conventional shovel 11 and a special carriage 12.

The shovel 11 includes a square configurated blade 13 having upwardly turned opposite side edges 14 which may be more or less in height depending on the type of shovel used and which may be designed for specific tasks. The blade designed for specific handle 15 secured thereto, the handle extending in a direction opposite to the front edge 16 of the blade.

The carriage 12 is comprised of a telescopic axle shaft 17 constituted of a central tubular section 18 receiving telescopically in each opposite end thereof an end section 19. Each end section has a wheel 20 secured rotatably free at the end thereof; and each end section further includes a spring band clamp 21 formed thereupon for the purpose of clipping over the upturned side edge 14 of the shovel blade 13.

In operative use, the carriage is simply fitted to the shovel as shown, thus forming a quickly made cart for performing simple transportation tasks which otherwise would be strenuous and back breaking to perform without the present invention.

It is understood that set screws may be employed for securing the axle shaft sections together in a rigid manner if so desired. Otherwise the telescopic length may be controlled by the clamps secured to the shovel blade edges.

As shown in FIG. 2, the shovel handle 15 may be provided with a transverse rivet 22 supporting a tension spring 23 with hook 24 at its free end to which transported objected may be secured, such as shown, and wherein garbage can 25 has a rope loop 26 inserted through opposite handles 27 of the garbage can, the rope loop being hooked over the hook 24 which thus supports the garbage can in an upright position while it is transported upon the shovel cart.

While various changes may be made in the detail construction it is to be understood that such changes will be within the spirit and scope of the present invention as is defined by the appended claims.

I claim:

1. A shovel cart comprising the combination of a shovel and a wheeled carriage having an axle with wheels at opposite ends of said axle including a pair of spring clips mounted on the axle adjacent each wheel, said clips having clamp portions extending axially towards each other spaced from and overlying said axle forming a pair of guides with the axle to removable receive the edges of said shovel in clamping fashion upon said axle said shovel having tapered edges adapted to enter the said guides in wedgelike fashion until securely clamped within said guides with the leading edges of the shovel extending beyond the axle in cantilever arrangement whereby the leading edges of the shovel can conveniently be inserted under the object to be moved.

2. The combination as in claim 1. wherein said axle is axially telescopic within an external sleeve and wherein a spring is mounted on the shovel handle for attachment with the object to be carried on the shovel.

* * * * *